June 11, 1929.　　　M. CZARNY ET AL　　　1,717,096
METHOD AND APPARATUS FOR RECTIFYING LUBRICATING OIL
Filed July 6, 1927　　2 Sheets-Sheet 1
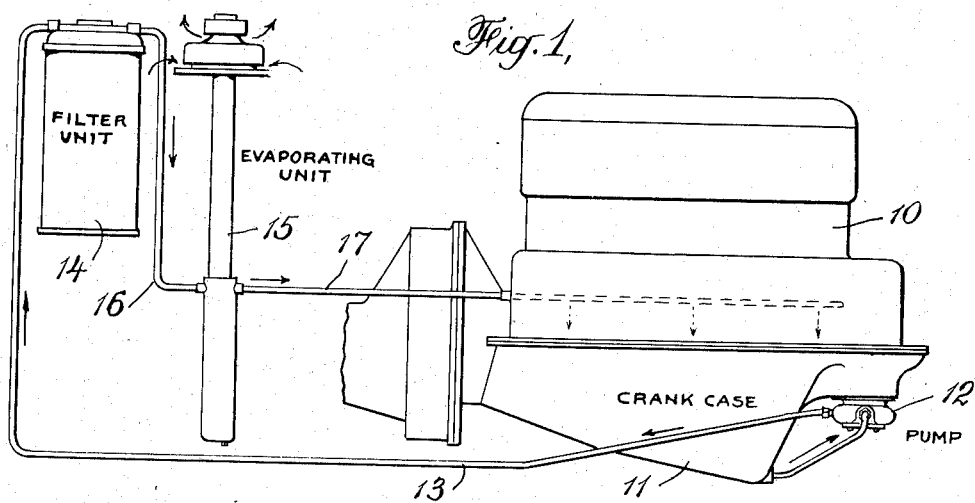
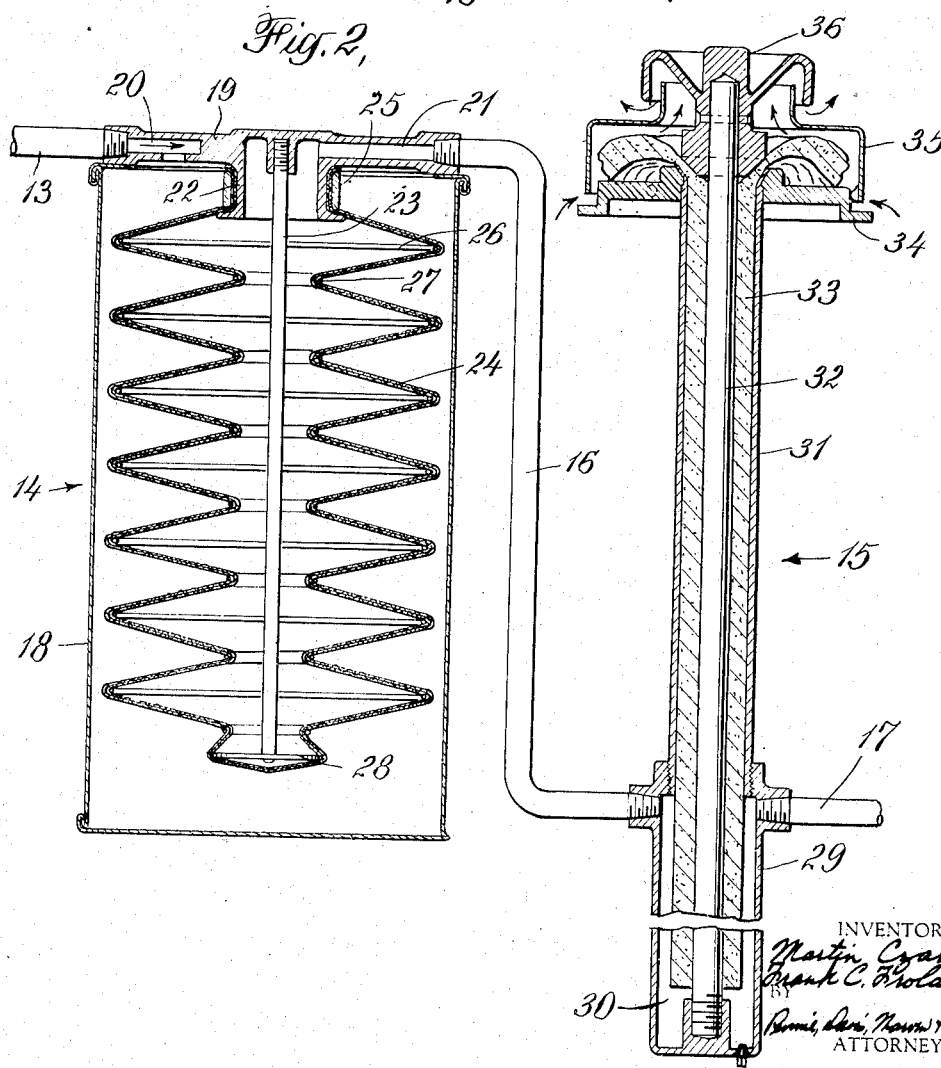
INVENTORS
Martin Czarny
Frank C. Frolander
BY
ATTORNEYS June 11, 1929.    M. CZARNY ET AL    1,717,096
METHOD AND APPARATUS FOR RECTIFYING LUBRICATING OIL
Filed July 6, 1927    2 Sheets-Sheet 2
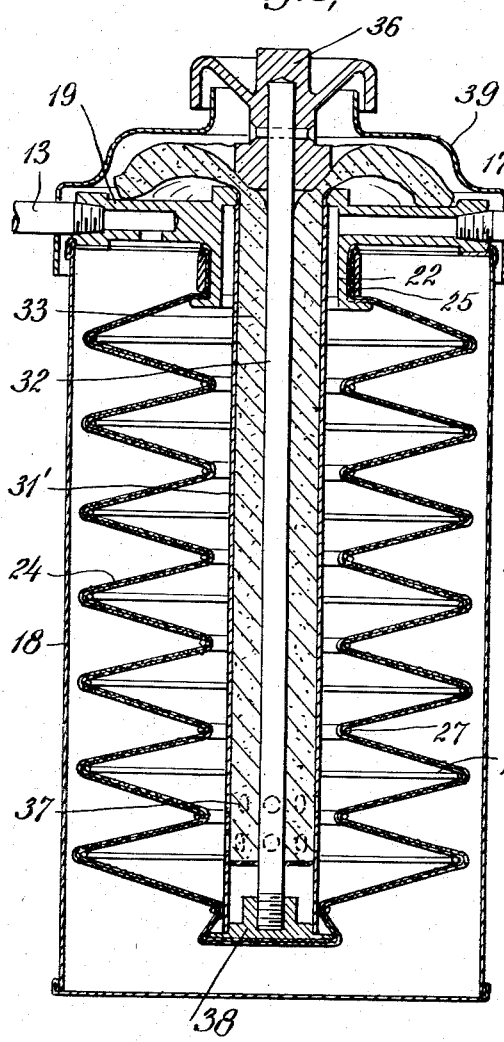
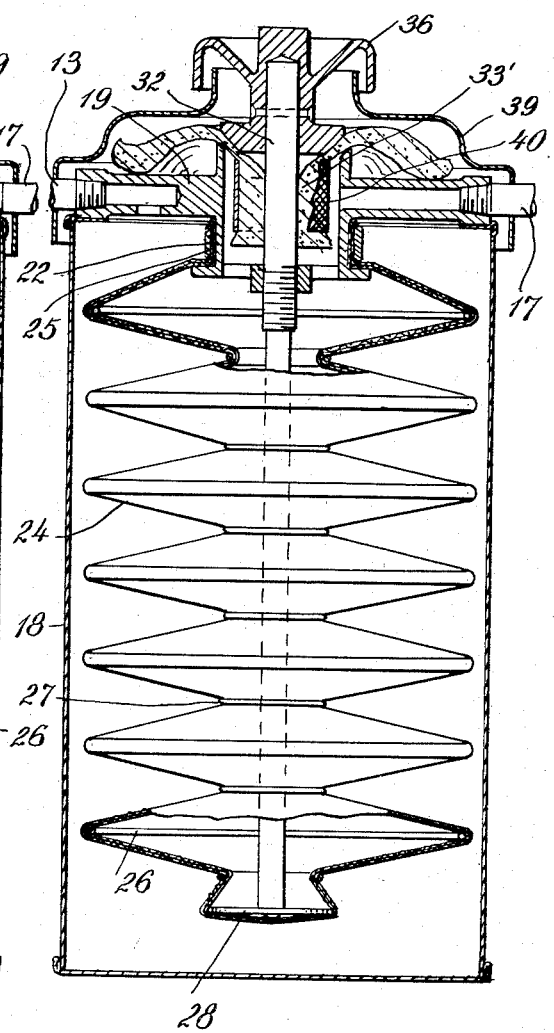

Patented June 11, 1929.

1,717,096

UNITED STATES PATENT OFFICE.

MARTIN CZARNY, OF ROSELLE, AND FRANK CONRAD FROLANDER, OF ELIZABETH, NEW JERSEY.

METHOD AND APPARATUS FOR RECTIFYING LUBRICATING OIL.

Application filed July 6, 1927. Serial No. 203,740.

This invention relates to oil rectifying systems and is concerned particularly with an apparatus which will maintain the quality of lubricating oil constant during the operation of an engine, and especially an internal combustion engine. It is a matter of common knowledge that during the operation of an internal combustion engine on relatively volatile hydrocarbon fuels such as gasoline, some of the fuel leaks past the piston rings and becomes mixed with the lubricant in the crank case. The lubricating oil is thus diluted and deteriorated, since the fuel cuts the lubricant and decreases its lubricating qualities. Likewise, water is formed in the engine and is carried in with the air, so that the lubricating oil is further diluted, and as the water has no lubricating qualities, it detracts from the volume of necessary lubricant, resulting in increased wearing of the bearings and other moving parts. After some use, the lubricating oil also contains solid matter such as hard and soft carbon particles resulting from imperfect combustion, dust and grit carried in by the air, particles of metal caused by wear, and the like.

In order to eliminate excessive wearing of the moving parts of the engine due to imperfect or incomplete lubrication, and to obtain a smoother operation and better operating efficiency, it has been the practice heretofore to drain the crank-case of the engine at certain intervals and refill it with clean lubricating oil. Frequently, however, this renewing of the lubricant is overlooked and damage to the engine, as well as inefficient operation, results. Furthermore, the renewal of the lubricant, if done as often as necessary, is expensive and wasteful, since the lubricating value of the discarded oil remains unchanged if the diluents and other liquid and solid foreign materials are removed therefrom.

It is the principal object of this invention to provide an apparatus for maintaining the quality of the lubricating oil in an internal combustion engine constant by removing therefrom the various diluents and solid impurities, without making it necessary to stop the engine at frequent intervals to replenish, renew or refine the lubricating oil. Another object of this invention is to provide an oil rectifying system which is automatic, inexpensive, efficient and fool-proof.

In practising this invention, the rectifying means is inserted in the lubricating oil circulating system, such as that employed in an automobile, where the oil is removed from the crank-case and circulated by an oil pump to be subsequently returned to the crank-case. The rectifier of the invention removes the solid foreign materials by filtration and the liquid diluents by capillary separation, and then these diluents, after being removed from the lubricating oil, are evaporated.

In one preferred form of apparatus, the deteriorated lubricant is initially passed through a suitable filter, which also passes the liquid diluents such as gasoline and water, while the solid particles of carbon, metal, dirt, grit and the like, are collected in a sump to be subsequently removed. The diluents flow with the filtered lubricating oil into contact with a capillary column such as a fibrous wick, which elevates the liquids to a varying degree according to their several capillary activities. For example, the gasoline rises first, the water next, and the oil last, but the wick is confined or constricted at an elevated point in such a manner that only the gasoline and water can pass this point, while the negligible amount of oil which has risen to this point is restrained against passing. The oil does not clog the wick because it is thinned by the gasoline which is a solvent of the oil. The area of the wick beyond the constricted point is considerably increased so that a large evaporating surface is exposed to a natural circulation of air through a form of chimney, this air accordingly removing the gasoline and water by evaporation. Inasmuch as the volume of gasoline contained in the lubricating oil under ordinary conditions exceeds the volume of water, and as gasoline has a higher factor of evaporation than water, the evaporation of both takes place at the proper rate to compensate for the difference in volume. It will be seen, therefore, that since the apparatus is simple and has no moving parts, it will not get out of order, and performs its function without using additional power or requiring other connections than those commonly used in lubricating oil circulating systems such as those used on most forms of internal combustion engines.

For a better understanding of the invention, reference is made to the accompanying drawings in which Figure 1 is diagrammatic view, showing the application of the oil rectifying system of this invention as applied to an internal combustion engine;

Fig. 2 is an enlarged view of a vertical section of the filtering and evaporating units; and Figs. 3 and 4 are modifications of the filtering and evaporating apparatus combined in one unit.

In the drawings numeral 10 designates an internal combustion engine from the crank case 11 of which the lubricating oil is circulated to the various moving parts of the engine by means of an oil pump 12 in the customary manner. The oil is forced by pump 12 through pipe 13 into oil filter 14 from which it is transferred to the evaporating unit 15 by pipe 16 and from evaporating unit 15, it is returned to the engine by way of pipe 17.

Referring to Fig. 2, the oil filter 14 comprises a sheet metal container 18 provided with a cover 19, having inlet and outlet openings 20 and 21 respectively, to which pipes 13 and 16 are respectively connected. The interior of cover 19 is provided with a collar 22 and a central depending rod 23 which hold the oil filter bag 24. This bag 24 preferably consist of two layers of cloth, the outside layer being of comparatively coarse weave while the inner layer is of a finer weave and has a fine hair-like nap on its outer surface which contacts with the coarse outer cloth. The nap on the outside of the inner cloth is matted against its own surface by the tightly stretched outer cloth, thus forming a very fine screen or filter. The open end of the filter bag 24 is held in position on collar 22 by means of a flat ring 25 of metal or the like. In order to provide a large filter surface to the bag so as to contain it in the small space within the confines of container 18, a number of alternate large and small rings 26 and 27, respectively, are employed in such a way that the bag has a bellows-like appearance. A disc 28 mounted on the lower end of rod 23 co-acts with the rod to hold the surface of the filter cloth tautly between the large and small rings.

The lower portion or cup 29 of the evaporating unit 15 is connected to the outlet 21 of the filter unit 14 by means of pipe 16 so as to provide a reservoir and sump 30 for the reception of the oil transferred from the filter unit 14. The open end of cup 29 is provided with a tube 31 while a vertical rod 32 is mounted in the bottom of the cup 29. In the space between rod 32 and the inside of tube 31 is the vertical wick 33 which is preferably made of absorbent cotton cloth and which extends from a point near the bottom of sump 30 to over the top end of tube 31. The upper end of wick 33 is slit radially so as to provide a large evaporating surface which is contained in the space formed by the baffle collar 34 mounted on tube 31 and the baffle cover 35. A knob 36 is mounted on the tube end of rod 32 and is shaped so as to compress the wick 33 against the outer edge of tube 31 so that the wick is constricted or necked in at a point between the vertical portion thereof and the evaporating surface. The outer edges of nut 36 are formed so as to cover the top edge of baffle cover 35 but baffle cover 35 is out of contact with nut 36 and is also spaced from collar 34 so that a free circulation of air is permitted through the space between baffle cover 35 and the inner portion of nut 36. This chimney-like construction permits a free circulation of the air around the evaporating surfaces of wick 33, whereby the liquids elevated thereby are evaporated. The discharge of the evaporating unit takes place through pipe 17 connected to sump cup 29, whereby the cleaned oil is returned to the engine.

Fig. 3 shows a modified form of rectifying unit in which the oil filter and evaporator are combined into a single unit. In this modification the cover 19 of container 18 is provided with a central opening in which is mounted tube 31'. The interior of tube 31' communicates with the interior of the filter bag 24 by means of a series of holes 37 provided near the bottom of the tube. The bottom of tube 31' is closed by a plug 38 which holds the bottom of filter bag 24 and also carries rod 32, the upper end of which is provided with the nut 36. The wick 33 extends to holes 37 while the enlarged upper end thereof lies in the space formed between the top of cover 19 and baffle cover 39. This baffle cover is shaped so as to provide free circulation of air through the space occupied by the evaporating end of wick 33. In this manner both the evaporating unit and the filter unit are combined.

Fig. 4 shows an arrangement which is similar to that shown in Fig. 3 except that the wick 33' is considerably shortened so as to extend only a slight distance into the interior of container 18. The rod 32 is supported by the collar 22 of cover 19 while the evaporating end of wick 33' is enclosed by the same baffle cover 39 as is illustrated in Fig. 3. In this way a considerable length of the wick is eliminated and the tube which encloses the wick is replaced by a short collar 40.

In operation, the oil may be pumped through the oil rectifying system of this invention in the manner illustrated by Figure 1, i. e., in connection with an internal combustion engine. The impure oil enters the filter container 18 by way of pipe 13 and the pressure therein keeps the oil in container 18 in continual agitation, more at the top of the container than at the bottom. The heavier foreign material containing the solid matter such as hard and soft carbon flakes, grit and particles of metal, will settle in the sump space provided at the bottom of the container 18 while the oil diluted by water and gasoline will filter through the two layers comprising the filter bag 24. In this way, the solid foreign materials are removed by filtration.

The filtered mixture of oil, water and gasoline will then pass out by way of opening 21 and pipe 16 into the sump cup 29 of the evaporating unit. In this sump cup, the division of the liquid materials according to their densities will take place to a large extent. For example, the water being heavier will collect at the bottom of the sump, the oil as the next layer, a mixture of gasoline and oil as the third layer and a substantially undiluted gasoline as the fourth layer. Inasmuch as the lower portion of the wick 33 extends substantially to the bottom of the sump space 30, it will absorb the water as well as the gasoline and oil. The wick material has a greater capillary affinity for the gasoline, less capillary affinity for water and least capillary affinity for oil, although all three of these liquids will rise substantially to the top of the wick. The oil does not clog the wick because it is thinned by the gasoline which is a solvent of the oil. However, toward the top of the wick the quantity of the oil is negligible while the gasoline and water are in greater quantity. Accordingly there are two forces which tend to raise the liquids to the top of the wick, the first being the pressure caused by the pump 12 in forcing the lubricant through the system and the second force being that of capillary action which raises the liquids out of sump space 30. The constricted or necked-in portion of the wick at the top of tube 31 caused by the pressure of the wedge of knob 36 against the upper edge of tube prevents the passage of the oil but permits the gasoline and water to seep through into the spread-apart end of the wick where they are evaporated by the air passing under the edge of baffle cover 35 through the chamber formed thereby and out over the top edge thereof. Inasmuch as this evaporating unit is usually mounted in a region of warm air, such as beneath the engine hood of an automobile, the warm air circulation will promote the evaporation of the gasoline and water. As usually occurs, the amount of gasoline contained in the lubricating oil is greater than the amount of water contained thereby but inasmuch as gasoline is more rapidly raised by the wick 33, due to its greater capillary activity, and as it evaporates at a greater rate than water, the excess volume of gasoline over the volume of water will be compensated for. This action leaves nothing but the pure lubricating oil which accordingly passes out by way of pipe 17 and is returned to the engine in the usual way.

The modification illustrated in Fig. 3 combines the filtering unit and the evaporating unit by introducing the wick column into the center of the filter bag. The mixture of oil, gasoline and water which passes through the pores of filter bag 24 surrounds tube 31'. In the manner described in connection with Fig. 2, wick 33 absorbs all three of the liquid constituents but has a greater capillary affinity for gasoline, less capillary affinity for water and least capillary affinity for heavy oil. The gasoline rises at such a rate as to reach the top of the wick before the water while the water rises before the partly diluted oil. By this action the higher in the wick that the oil rises, the more diluted it will be by the gasoline and water until all of the diluents are entirely eliminated by evaporation in the evaporation chamber formed by baffle cover 39. This will leave only pure oil which is unable to pass the compressed portion of the wick at the top of tube 31'. The purified lubricating oil accordingly flows out by way of pipe 17 in the manner described.

In Fig. 4 is illustrated a second compact form of apparatus. In this modification the greater portion of the wick is eliminated, leaving only a short length 33' extending into the top of container 18 and the same spread-apart evaporating portion enclosed by baffle cover 39. After the solid matter is removed from the impure oil by its passage through the pores of filter bag 24, it must come into contact with the lower end of wick 33' before it can pass out by way of pipe 17. In this way, the wick 33' having a greater affinity for gasoline and water than for the oil, removes the gasoline and water from the oil. As described, the necked-in portion of the wick prevents the oil under pressure from passing out into the evaporator portion of the wick while the gasoline and water are evaporated.

Among the tests which have been made of the new system of rectifying impure lubricating oils, the end of a dry cotton wick was immersed in pure lubricating oil. Upon this layer of lubricating oil were poured clean water and clear gasoline and after a short time the wick was found to contain gasoline and water in addition to the oil. Later the gasoline was in evidence at the free end of the wick and was allowed to evaporate until entirely dissipated when water took its place and the same occurrence took place. After the water had evaporated, it was found that nothing but the pure oil remained in the container and in the wick. So long as the oil contains gasoline and water, the lubricating oil does not rise as far as the free end of the wick for the reason that the capillary activities of the gasoline and water exceed that of lubricating oil and reach the free end of the wick before the oil. By employing the apparatus of this invention under the pressure supplied by the oil pump of an automobile, e. g., it was found that the rectification of the oil takes place at a very rapid rate and that the residue of lubricating oil is very pure and clear so that it may be used over and over again and has the same lubricating effect as new oil.

Accordingly, it will be seen that the present invention provides an extremely simple and very efficient oil rectifying system which can be installed in an automobile or other apparatus employing circulating lubricating oil with little cost and no modification of the operating parts of the engine. In an automobile, it is only necessary to insert the rectifying apparatus of this invention in the lubricating oil supply or return line and the apparatus may be conveniently mounted on the rear of the dash of the automobile in a position similar to that or adjacent to that occupied by the vacuum tank. The filtering unit of the rectifying apparatus is preferably made of thin sheet metal and is very inexpensive so that if the sump space thereof becomes clogged with a large accumulation of foreign matter, such as grit, carbon particles, metal particles and the like, it may be removed and replaced by a new filter unit without incurring any great expense or difficulty. Accordingly, by employing the rectifying system of this invention, a considerable saving in the operation of an automobile or the like may be effected, inasmuch as the lubricating oil is always pure and consequently no excessive wearing of the moving parts lubricated thereby occurs. Furthermore, it will be unnecessary to drain the crank case frequently and replace the impure oil by fresh oil since by using the new system, the oil is always fresh and clean.

While several preferred embodiments of the invention have been illustrated and described herein, it is to be understood that the invention is not limited thereby, but is susceptible of many changes in form, arrangement and use. For example, it might be used with equal facility on other apparatus than on an internal combustion engine, and is capable of use under any conditions for purifying lubricating oils, whether used or not, which contain foreign liquids having greater capillary activity than the oil itself. It is also to be understood that the term "wick" as used herein comprehends all forms of capillary bodies or devices having connected or continuous pores, passages or the like, in which liquids may elevate themselves by their own capillary activities.

We claim:

1. A rectifier for used lubricating oil containing liquid diluents, adapted for use in connection with an internal combustion engine, comprising a container for the oil and a capillary wick inserted in the container for abstracting the liquid diluents from the oil by capillary action.

2. An apparatus for rectifying used lubricating oil containing liquid diluents, adapted for use in connection with an internal combustion engine, comprising a capillary wick inserted in the oil for abstracting the liquid diluents from the oil, and means for evaporating these diluents from the wick.

3. A rectifier for used lubricating oil comprising a container for the oil, adapted for use in connection with an internal combustion engine, a capillary wick for abstracting the contained liquid diluents from the oil, means for introducing the used oil to the lower portion of the wick, and means for evaporating the diluents from the top of the wick.

4. A rectifier for used lubricating oil containing liquid impurities, adapted for use in connection with an internal combustion engine, comprising a container for the oil, a wick inserted in oil in the container for abstracting the liquid impurities therefrom by capillary action, the upper portion of the wick being of relatively large surface area and extending into a container for receiving the liquid impurities from the wick and evaporating the same.

5. A rectifier for used lubricating oil containing foreign liquids, adapted for use in connection with an internal combustion engine, comprising a wick for abstracting the liquids by capillary action, and a constriction in said wick for preventing the passage of the oil.

6. A rectifier for used lubricating oil containing liquid diluents, adapted for use in connection with an internal combustion engine, comprising a wick inserted in the oil for abstracting the diluents by capillary action, and means forming a constriction in said wick for preventing the passage of oil therethrough.

7. A rectifier for used lubricating oil containing liquid impurities, comprising a closed container for the oil, oil intake and outlet pipes communicating with the interior of said container, a tubular member inserted through the wall of said container, a wick in said tube having a portion extending into said container for abstracting the liquid impurities therefrom by capillary action, said wick terminating in an enlarged portion lying outside of said tube for receiving the liquid impurities and evaporating the same.

8. A rectifier for used lubricating oil containing liquid impurities, comprising a closed container for the oil, oil intake and outlet pipes communicating with the interior of said container, a tubular member inserted through the wall of said container, a rod inserted through said member into the container, a wick mounted upon said rod and having a portion extending into the container for abstracting the liquid impurities therefrom by capillary action, said wick having an exposed portion outside of said tube for receiving the liquid impurities from the immersed portion, and a collar mounted upon said rod for compressing said wick between it and said member whereby a constriction is formed in said wick.

9. In an oil rectifying apparatus for internal combustion engines having a lubricating oil circulating sysem, the combination of a container introduced in said system for receiving at least part of the oil circulated thereby, an evaporator mounted with said container, and a wick inserted in the oil in the container and extending into said evaporator, said wick being adapted to abstract the liquid impurities deposited in the lubricating oil during operation of the engine and transfer said liquid impurities to said evaporator.

10. The method of rectifying used lubricating oil containing liquid impurities adapted for use in connection with an internal combustion engine, which consists in abstracting the liquid impurities from the oil by capillary action.

11. The method of rectifying used lubricating oil, adapted for use in connection with an internal combustion engine, which consists in selectively abstracting diluents by utilizing their greater capillary action.

12. The method of rectifying used lubricating oil containing liquid diluents, adapted for use in connection with an internal combustion engine, which consists in continuously supplying the oil and abstracting the diluents from the oil by capillary action.

13. The method of rectifying used lubricating oil containing liquid diluents, adapted for use in connection with an internal combustion engine, which consists in continuously removing the diluents from the oil by capillary action and continuously evaporating the same whereby other diluents may be removed by the capillary action.

14. The method of rectifying used lubricating oil containing gasoline, adapted for use in connection with an internal combustion engine, which consists in abstracting the gasoline from the oil by its capillary action.

In testimony whereof we affix our signatures.

MARTIN CZARNY.
FRANK CONRAD FROLANDER.